(12) United States Patent  
Kim et al.

(10) Patent No.: US 12,305,899 B2  
(45) Date of Patent: May 20, 2025

(54) AIR CONDITIONER

(71) Applicant: LG ELECTRONICS INC., Seoul (KR)

(72) Inventors: Daehyoung Kim, Seoul (KR); Yongcheol Sa, Seoul (KR); Eunjun Cho, Seoul (KR); Junseong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 18/022,873

(22) PCT Filed: Aug. 27, 2021

(86) PCT No.: PCT/KR2021/011515  
§ 371 (c)(1),  
(2) Date: Feb. 23, 2023

(87) PCT Pub. No.: WO2022/045829  
PCT Pub. Date: Mar. 3, 2022

(65) Prior Publication Data  
US 2023/0228469 A1    Jul. 20, 2023

(30) Foreign Application Priority Data

Aug. 31, 2020    (KR) .................. 10-2020-0110046

(51) Int. Cl.  
*F25B 41/42* (2021.01)  
*B01D 19/00* (2006.01)  
*F25B 39/02* (2006.01)

(52) U.S. Cl.  
CPC .......... *F25B 41/42* (2021.01); *B01D 19/0042* (2013.01); *B01D 19/0068* (2013.01);  
(Continued)

(58) Field of Classification Search  
CPC .......... F25B 41/42; F25B 41/40; F25B 41/48; F25B 39/028; F25B 2400/0409; F25B 2400/23; F25B 43/006  
See application file for complete search history.

(56) References Cited

U.S. PATENT DOCUMENTS

| 2017/0167766 A1 | 6/2017 | Jeong et al. |
| 2020/0149751 A1 | 5/2020 | Cho et al. |

(Continued)

FOREIGN PATENT DOCUMENTS

| KR | 10-2014-0013698 | 2/2014 |
| KR | 10-2017-0069016 | 6/2017 |

(Continued)

OTHER PUBLICATIONS

International Search Report (with English Translation) dated Dec. 24, 2021 issued in Application No. PCT/KR2021/011515.

*Primary Examiner* — Miguel A Diaz  
(74) *Attorney, Agent, or Firm* — KED & ASSOCIATES

(57) ABSTRACT

An air conditioner is provided that includes a compressor that compresses a refrigerant; an accumulator that supplies the refrigerant to the compressor; a condenser that condenses the refrigerant discharged from the compressor; an expansion valve that expands the refrigerant having passed through the condenser; an evaporator that includes a heat exchange pipe through which the refrigerant having passed through the expansion valve flows, and that evaporates the refrigerant flowing through the heat exchange pipe; a gas-liquid separation pipe that connects a first point and a second point located between a first end and a second end of the heat exchange pipe; and a bypass pipe a first end of which is connected to the gas-liquid separation pipe and a second end of which is connected to the accumulator. The gas-liquid separation pipe includes a first portion a first end of which is connected to the first point and a second end of which is (Continued)

connected to one end of the bypass pipe; and a second portion that extends from the first point between the first end and the second end of the first portion, and is connected to the second point.

8 Claims, 6 Drawing Sheets

(52) U.S. Cl.
CPC .... *F25B 39/028* (2013.01); *F25B 2400/0409* (2013.01); *F25B 2400/23* (2013.01)

(56) References Cited

U.S. PATENT DOCUMENTS

| | | | |
|---|---|---|---|
| 2020/0318870 A1* | 10/2020 | Cho | F25B 39/02 |
| 2021/0123646 A1* | 4/2021 | Kim | F25B 41/40 |

FOREIGN PATENT DOCUMENTS

| | | |
|---|---|---|
| KR | 10-2018-0104416 | 9/2018 |
| KR | 10-2020-0050645 | 5/2020 |
| KR | 10-2020-0053269 | 5/2020 |

* cited by examiner

AIR CONDITIONER

CROSS-REFERENCE TO RELATED PATENT APPLICATIONS

This application is a U.S. National Stage Application under 35 U.S.C. § 371 of PCT Application No. PCT/KR2021/011515, filed Aug. 27, 2021, which claims priority to Korean Patent Application No. 10-2020-0110046, filed Aug. 31, 2020, whose entire disclosures are hereby incorporated by reference.

TECHNICAL FIELD

The present disclosure relates to an air conditioner. In particular, the present disclosure relates to an air conditioner capable of reducing a pressure loss of a refrigerant flowing through an evaporator by separating a gaseous refrigerant from the evaporator at a middle stage of the evaporator.

BACKGROUND ART

Generally, an air conditioner refers to an apparatus that cools and heats a room through processes of compression, condensation, expansion, and evaporation of a refrigerant. When an outdoor heat exchanger of the air conditioner serves as a condenser and an indoor heat exchanger serves as an evaporator, the room may be cooled. Conversely, when the outdoor heat exchanger of the air conditioner serves as an evaporator and the indoor heat exchanger serves as a condenser, the room may be heated.

Meanwhile, when the refrigerant passes through the evaporator and is evaporated to expand a volume, the flow rate of the refrigerant may increase significantly. In this case, a significant pressure loss of the refrigerant occurs in the second half of the evaporator, and thus the performance of the air conditioner may be significantly deteriorated.

Recently, many studies have been conducted on ways to minimize the pressure loss of the refrigerant passing through the evaporator.

DISCLOSURE OF INVENTION

Technical Problem

An object of the present disclosure is to solve the foregoing and other problems.

Another object of the present disclosure is to provide an air conditioner capable of separating gaseous refrigerant from an evaporator at a middle stage of the evaporator and bypassing the gaseous refrigerant to an accumulator or a compressor.

Another object of the present disclosure is to propose a structure capable of improving a separation rate of gaseous refrigerant and liquid refrigerant at the middle stage of the evaporator.

Another object of the present disclosure is to provide an air conditioner capable of variably setting a point at which a gaseous refrigerant and a liquid refrigerant can be efficiently separated, in preparation for a change in flow rate of the refrigerant flowing into the evaporator.

Solution to Problem

According to an aspect of the present disclosure for achieving the above or other object, there is provided an air conditioner including: a compressor which compresses refrigerant; an accumulator which supplies refrigerant to the compressor; a condenser which condenses refrigerant discharged from the compressor; an expansion valve which expands refrigerant passing through the condenser; an evaporator which has a heat exchange pipe through which refrigerant passing through the expansion valve flows, and evaporates refrigerant flowing through the heat exchange pipe; a gas-liquid separation pipe which connects a first point and a second point located between one end and the other end of the heat exchange pipe; and a bypass pipe which has one end connected to the gas-liquid separation pipe and the other end connected to the accumulator, wherein the gas-liquid separation pipe comprises: a first part which has one end connected to the first point and the other end connected to one end of the bypass pipe; and a second part which extends from the first part at between one end and the other end of the first part, and is connected to the second point.

Advantageous Effects of Invention

The effects of the air conditioner according to the present disclosure are described as follows.

According to at least one embodiment of the present disclosure, an air conditioner capable of separating gaseous refrigerant from an evaporator at a middle stage of the evaporator and bypassing the gaseous refrigerant to an accumulator or a compressor may be provided.

According to at least one embodiment of the present disclosure, a structure capable of improving a separation rate of gaseous refrigerant and liquid refrigerant at the middle stage of the evaporator may be proposed.

According to at least one embodiment of the present disclosure, it is possible to provide an air conditioner capable of variably setting a point at which a gaseous refrigerant and a liquid refrigerant can be efficiently separated, in preparation for a change in flow rate of the refrigerant flowing into the evaporator.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

MODE FOR THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise).

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Figure 1:
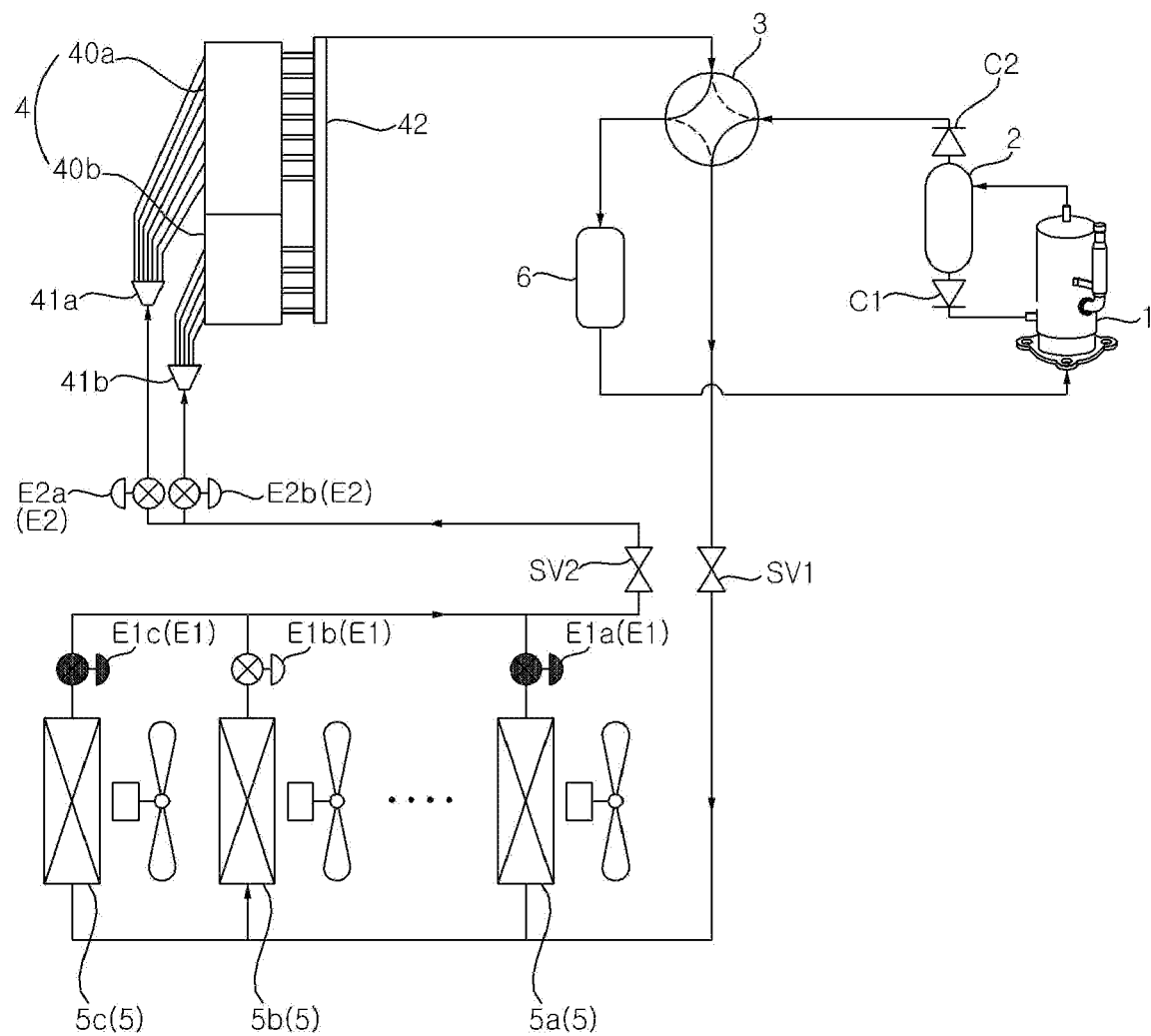
FIG. 1 is a diagram illustrating a configuration of an air conditioner and a flow of refrigerant during a heating or cooling operation according to an embodiment of the present disclosure.

Referring to FIG. 1, an air conditioner may include a compressor 1, an oil separator 2, a switching valve 3, an outdoor heat exchanger 4, an indoor heat exchanger 5, an accumulator 6, and an expansion valve E1, E2 that are connected to each other by a refrigerant pipe.

The compressor 1 may compress the refrigerant flowed from the accumulator 6 and discharge the high-temperature, high-pressure refrigerant. For example, the compressor 1 may be an inverter compressor capable of controlling the amount of refrigerant and the discharge pressure of the refrigerant by adjusting an operating frequency. For example, the compressor 1 may be an oil compressor in which oil is used as a lubricant.

The oil separator 2 may recover oil from the refrigerant discharged from the compressor 1 and provide it to the compressor 1 again. At this time, a first check valve C1 may be installed in a pipe through which the oil separated from the oil separator 2 flows, and may restrict the flow direction of the oil to a direction from the oil separator 2 to the compressor 1.

The switching valve 3 may selectively guide the refrigerant flowed from the oil separator 2 to the outdoor heat exchanger 4 or the indoor heat exchanger 5. For example, the switching valve 3 may be a four-way valve.

The outdoor heat exchanger 4 may exchange heat between the refrigerant and outdoor air. The direction of heat transfer between the refrigerant and outdoor air in the outdoor heat exchanger 4 may be different depending on the operation mode of the air conditioner, that is, whether it is a cooling operation or a heating operation. An outdoor fan (not shown) may be disposed in one side of the outdoor heat exchanger 4 to adjust the amount of air supplied to the outdoor heat exchanger 4.

For example, two outdoor heat exchangers 4 may be provided. That is, the outdoor heat exchanger 4 may include a first outdoor heat exchanger 40a located in a relatively upper side and a second outdoor heat exchanger 40b located in a relatively lower side. However, there may be provided a single outdoor heat exchanger 4, or there may be provided three outdoor heat exchangers 4 or more.

The indoor heat exchanger 5 may exchange heat between the refrigerant and indoor air. The direction of heat transfer between the refrigerant and indoor air in the indoor heat exchanger 5 may be different depending on the operation mode of the air conditioner, that is, whether it is a cooling operation or a heating operation. An indoor fan (not shown) is disposed in one side of the indoor heat exchanger 5 to adjust the amount of air supplied to the indoor heat exchanger 5.

For example, the indoor heat exchanger 5 may include a plurality of indoor heat exchangers 5a, 5b, and 5c. In this case, some of the plurality of indoor heat exchangers 5a, 5b, and 5c may be operated, and others may be non-operated, in response to an indoor heating or cooling demand load.

The expansion valves E1 and E2 may be installed between the outdoor heat exchanger 4 and the indoor heat exchanger 5 to expand the refrigerant passing through the outdoor heat exchanger 4 or the indoor heat exchanger 5. At this time, the expansion valves E1 and E2 may include an outdoor expansion valve E2 adjacent to the outdoor heat exchanger 4 and an indoor expansion valve E1 adjacent to the indoor heat exchanger 5. In this case, the outdoor expansion valve E2 may be used to expand the refrigerant that passed through the indoor heat exchanger 5, and the indoor expansion valve E1 may be used to expand the refrigerant that passed through the outdoor heat exchanger 4. For example, the expansion valves E1 and E2 may be an Electronic Expansion Valve (EEV) capable of adjusting the degree of opening.

For example, the outdoor expansion valve E2 may include a first outdoor expansion valve E2a for expanding the refrigerant supplied to the first outdoor heat exchanger 40a, and a second outdoor expansion valve E2b for expanding the refrigerant supplied to the second outdoor heat exchanger 40b.

For example, the indoor expansion valve E1 may include a first indoor expansion valve E1a for expanding the refrigerant supplied to a first indoor heat exchanger 5a, a second indoor expansion valve E1b for expanding the refrigerant supplied to a second indoor heat exchanger 5b, and a third indoor expansion valve E1c for expanding the refrigerant supplied to a third indoor heat exchanger 5c.

Meanwhile, the air conditioner may include a plurality of sensors (not shown) for measuring the temperature or pressure of the refrigerant flowing through a refrigerant pipe.

Meanwhile, a controller C (not shown) may control the operation of the air conditioner. The controller C may be electrically connected to each component of the air conditioner described above. The controller C may perform a heating operation or a cooling operation by controlling the operation of each component of the air conditioner.

<Heat Operation Mode of Air Conditioner>

Referring to a solid line shown in the switching valve 3 of FIG. 1, when a heating operation signal is received by the air conditioner, the controller C may perform the heating operation of the air conditioner. For example, the heating operation signal may be a signal arbitrarily input by a user. For another example, the heating operation signal may be a signal that is provided to the controller C by a thermostat provided in an indoor space, when the indoor temperature detected by an indoor temperature sensor is lower than a desired temperature set by a user by a certain level or more.

Specifically, the low-temperature, low-pressure refrigerant flowing into the compressor 1 from the accumulator 6 may be compressed with a high-temperature, high-pressure in the compressor 1 and discharged to the oil separator 2. In addition, the refrigerant from which oil is separated in the oil separator 2 may flow into the second indoor heat exchanger 5$b$ via the switching valve 3 and a first service valve SV1. At this time, the second indoor expansion valve E1$b$ may completely open the passage of the refrigerant that passes through the second indoor heat exchanger 5$b$ and leads to the outdoor heat exchanger 4, and may not expand the refrigerant passing through the second indoor expansion valve E1$b$. In addition, the first indoor expansion valve E1$a$ and the third indoor expansion valve E1$c$ may pass through the first indoor heat exchanger 5$a$ and the third indoor heat exchanger 5$c$, and may close the passage of refrigerant leading to the outdoor heat exchanger 4. Meanwhile, when a required heating load increases, the first indoor expansion valve E1$a$ and/or the third indoor expansion valve E1$c$ may also be opened.

As thermal energy is transferred from the refrigerant to the indoor air in the second indoor heat exchanger 5$b$, the refrigerant may be condensed. At this time, the second indoor heat exchanger 5$b$ may serve as a condenser. In addition, the indoor space may be heated according to heat exchange between the refrigerant and indoor air. The refrigerant condensed while passing through the second indoor heat exchanger 5$b$ may pass through the second indoor expansion valve E1$b$ and a second service valve SV2, some of the refrigerant may pass through the first outdoor expansion valve E2$a$, and the remainder may pass through the second outdoor expansion valve E2$b$. The refrigerant expanded while passing through the first outdoor expansion valve E2$a$ may be distributed to a plurality of points of the first outdoor heat exchanger 40$a$ via a first distributor 41$a$. The refrigerant expanded while passing through the second outdoor expansion valve E2$b$ may be distributed to a plurality of points of the second outdoor heat exchanger 40$b$ via a second distributor 41$b$.

As the thermal energy of the outdoor air is transferred from the first outdoor heat exchanger 40$a$ and the second outdoor heat exchanger 40$b$ to the refrigerant, the refrigerant may be evaporated. At this time, the first outdoor heat exchanger 40$a$ and the second outdoor heat exchanger 40$b$ may serve as an evaporator. The refrigerant evaporated while passing through each of the first outdoor heat exchanger 40$a$ and the second outdoor heat exchanger 40$b$ may be integrated in a main header 42 and flow into the accumulator 6 via the switching valve 3. In addition, the accumulator 6 may provide gaseous refrigerant to the compressor 1. Thus, a refrigerant cycle for the heating operation of the above-described air conditioner may be completed.

<Cooling Operation Mode of Air Conditioner>

Referring to a dotted line shown in the switching valve 3 of FIG. 1, when the air conditioner receives a cooling operation signal, the controller C may perform the cooling operation of the air conditioner. For example, the cooling operation signal may be a signal arbitrarily input by a user. For another example, the cooling operation signal may be a signal that is provided to the controller C by a thermostat provided in the indoor space, when the indoor temperature detected by an indoor temperature sensor is higher than a desired temperature set by a user by a certain level or more.

Specifically, the low-temperature, low-pressure refrigerant flowing into the compressor 1 from the accumulator 6 may be compressed with a high-temperature, high-pressure in the compressor 1 and be discharged to the oil separator 2. The refrigerant from which oil is separated in the oil separator 2 may flow into the first outdoor heat exchanger 40$a$ and the second outdoor heat exchanger 40$b$ via the switching valve 3 and the main header 42.

As thermal energy is transferred from the refrigerant to the outdoor air in the first outdoor heat exchanger 40$a$ and the second outdoor heat exchanger 40$b$, the refrigerant may be condensed. At this time, the first outdoor heat exchanger 40$a$ and the second outdoor heat exchanger 40$b$ may serve as a condenser.

The refrigerant condensed while passing through the first outdoor heat exchanger 40$a$ may pass through the first distributor 41$a$, the first outdoor expansion valve E2$a$, and the second service valve SV2 in turn, and may flow into the second indoor expansion valve E1$b$. At this time, the first outdoor expansion valve E2$a$ may completely open the passage so that the refrigerant passing through the passage may not be expanded. The refrigerant condensed while passing through the second outdoor heat exchanger 40$b$ sequentially passes through the second distributor 41$b$, the second outdoor expansion valve E2$b$, and the second service valve SV2 may flow into the second indoor expansion valve E1$b$. At this time, the second outdoor expansion valve E2$b$ may completely open the passage so that the refrigerant passing through the passage may not be expanded. The refrigerant expanded while passing through the second indoor expansion valve E1$b$ may flow into the second indoor heat exchanger 5$b$.

As the thermal energy of outdoor air is transferred from the second indoor heat exchanger 5$b$ to the refrigerant, the refrigerant may be evaporated. At this time, the second indoor heat exchanger 5$b$ may serve as an evaporator. In addition, the indoor space may be cooled according to heat exchange between the refrigerant and indoor air. The refrigerant evaporated while passing through the second indoor heat exchanger 5$b$ may flow into the accumulator 6 via the first service valve SV1 and the switching valve 3. In addition, the accumulator 6 may provide gaseous refrigerant to the compressor 1. Thus, a refrigerant cycle for the cooling operation of the air conditioner described above can be completed.

Figure 2:
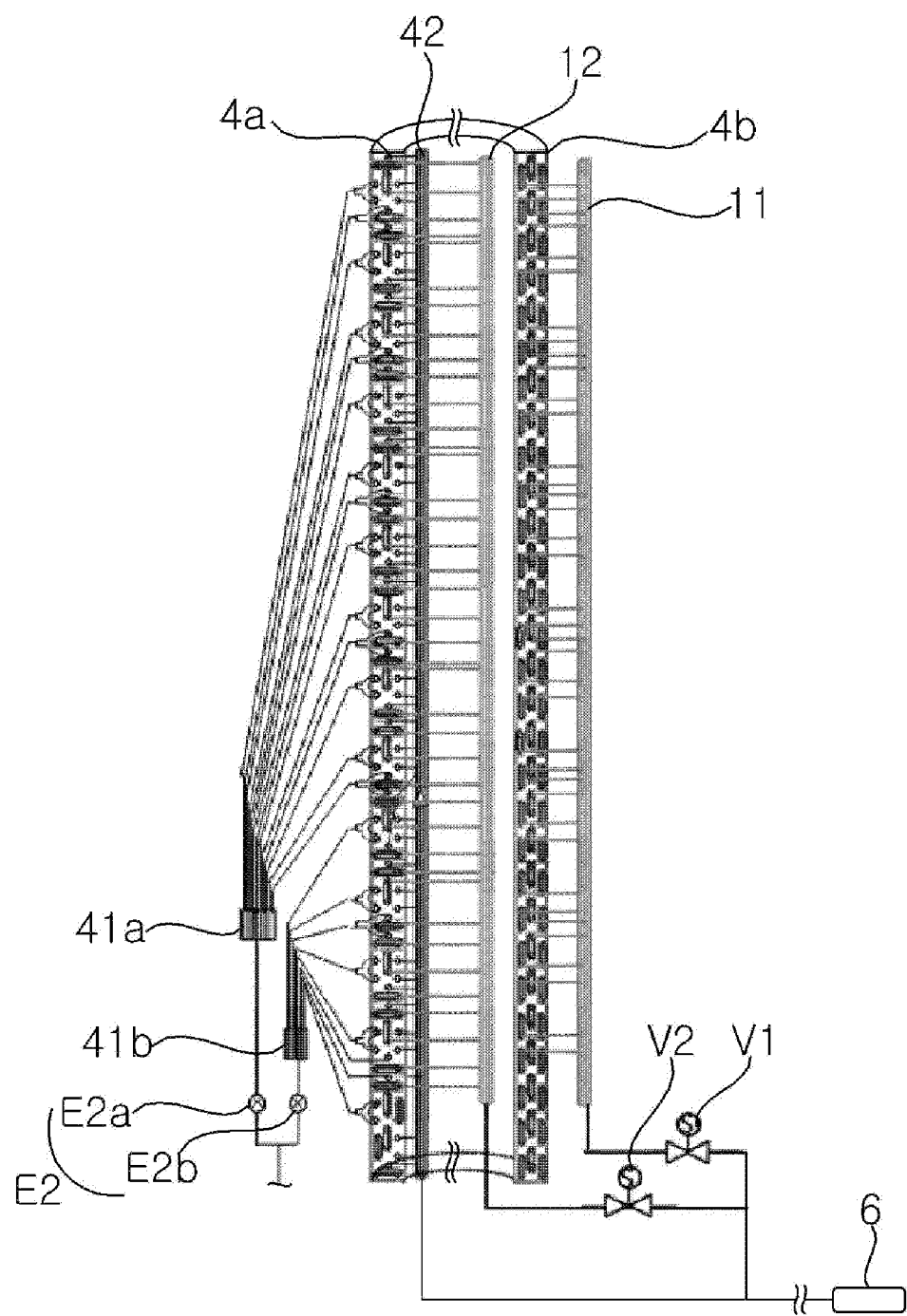
FIG. 2 is a diagram for explaining an outdoor heat exchanger according to an embodiment of the present disclosure and components connected thereto.

Referring to FIG. 2, a heat exchange pipe (not shown) through which a refrigerant flows may be installed inside the outdoor heat exchanger 4. In this case, outdoor air passes through the outdoor heat exchanger 4 and may exchange heat with the refrigerant flowing through the heat exchange pipe.

A plurality of heat exchange pipes may be provided in parallel. In this case, the refrigerant may be distributed from the above-described distributor 41$a$, 41$b$ to each of the plurality of heat exchange pipes. Thus, heat exchange between the air and the refrigerant may be fairly uniform throughout the outdoor heat exchanger 4.

In addition, a hole through which refrigerant is introduced or discharged may be formed at a distal end of the heat exchange pipe. For example, the distal end of the heat exchange pipe may be adjacent to a first surface 4a which is one surface of the outdoor heat exchanger 4.

In this case, the heat exchange pipe may be bent multiple times to alternately pass through the first surface 4a and a second surface 4b. Specifically, the heat exchange pipe may extend from one end adjacent to the first surface 4a to the second surface 4b opposite to the first surface 4a, and may be bent from the second surface 4b to extend to the first surface 4a. Subsequently, the heat exchange pipe may be bent from the first surface 4a and extended to the second surface 4b, and may be bent from the second surface 4b and extended to the first surface 4a again, so that the other end of the heat exchange pipe may be adjacent to the first surface 4a.

For example, a bent portion and other portion of the heat exchange pipe may be provided as a separate pipe to be connected to each other. For another example, the bent portion and other portion of the heat exchange pipe may be provided as one pipe.

Meanwhile, the gaseous refrigerant may be separated from the refrigerant flowing through the heat exchange pipe and supplied to the accumulator 6 through a first header 11 and/or a second header 12 which will be described in more detail later.

At this time, a first valve V1 may be installed in a first pipe (no reference numeral) installed between the first header 11 and the accumulator 6, and may open and close the passage of the first pipe. In addition, a second valve V2 may be installed in a second pipe (no reference numeral) installed between the second header 12 and the accumulator 6, and may open and close the passage of the second pipe. For example, the first valve V1 and the second valve V2 may be a solenoid valve.

Figure 3:
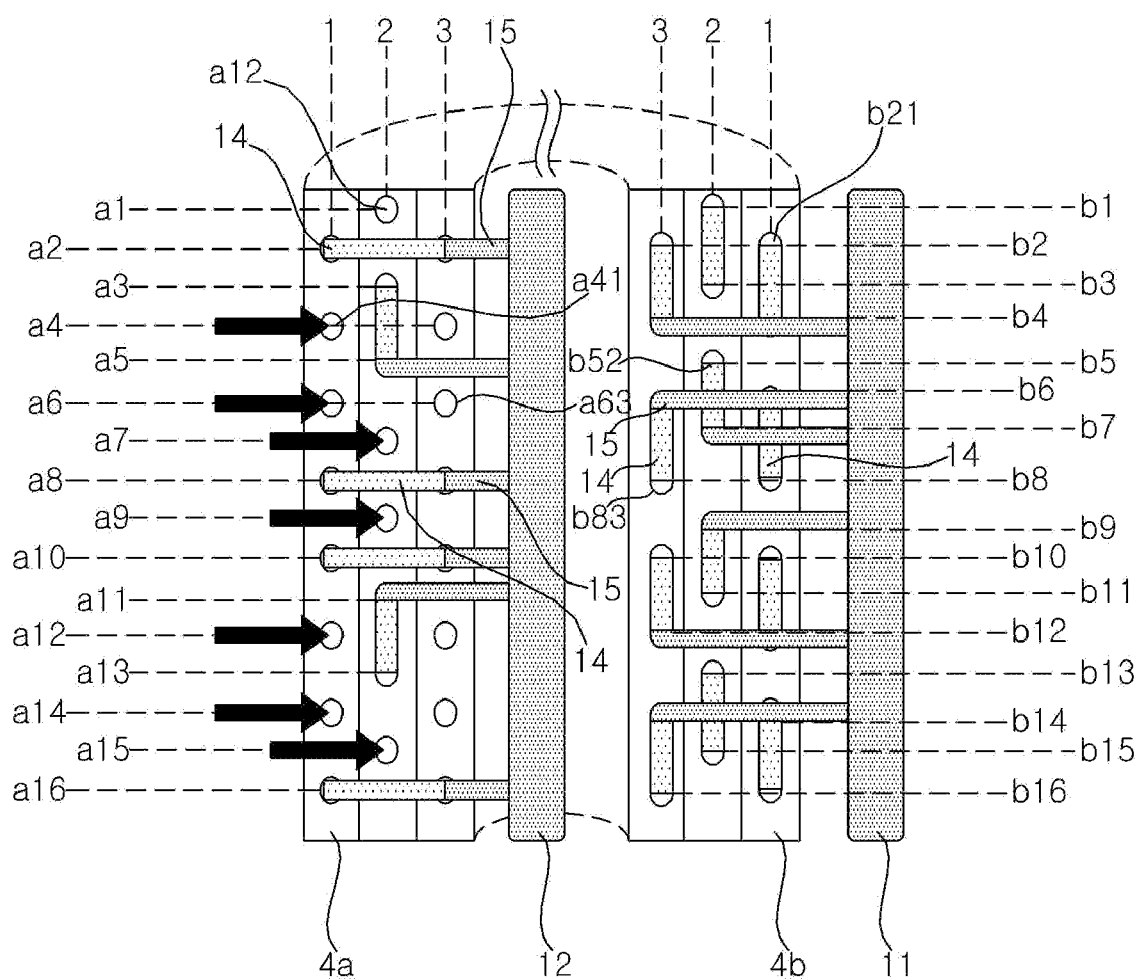
FIG. 3 is a diagram for explaining a gas-liquid separation pipe and a header into which a refrigerant separated therefrom flows according to an embodiment of the present disclosure.

Referring to FIGS. 2 and 3, on the first surface 4a of the outdoor heat exchanger 4, the distal end of the plurality of heat exchange pipes in which a plurality of holes through which refrigerant is introduced or discharged may be located or adjacent to each other.

Based on a case where the outdoor heat exchanger 4 serves as an evaporator, the plurality of holes may include a plurality of inflow holes a41, a61, a72, a92, a121, a141, and a152 into which the refrigerant distributed in the above-described distributor 41a, 41b flows, and a plurality of discharge holes a12, a43, a63, a123, a143 through which the refrigerant passing through the heat exchange pipe is discharged. In this case, the plurality of discharge holes a12, a43, a63, a123, and a143 may be connected to the above described main header 42.

In addition, any one of the plurality of inflow holes a41, a61, a72, a92, a121, a141, and a152 and any one of the plurality of discharge holes a12, a43, a63, a123, and a143 may exchange the plurality of heat exchange may be formed in one end and the other end of any one of the plurality of heat exchange pipes. In other words, the heat exchange pipes may be provided with the same number as the plurality of inflow holes a41, a61, a72, a92, a121, a141, and a152 or the plurality of discharge holes a12, a43, a63, a123, and a143.

Meanwhile, the refrigerant flowing into the plurality of inflow holes a41, a61, a72, a92, a121, a141, and a152 through the distributor 41a, 41b is a refrigerant expanded while passing through the above-described outdoor expansion valve E2, and may be a two-phase refrigerant in which a liquid refrigerant and a gaseous refrigerant exist together. The two-phase refrigerant flowing into each of the plurality of inflow holes a41, a61, a72, a92, a121, a141, and a152 may pass through each of the plurality of heat exchange pipes and be evaporated to increase dryness. In this case, the gaseous refrigerant may be separated from the refrigerant flowing through the heat exchange pipe and provided to the first header 11 or the second header 12 through a bypass pipe 15, and remaining liquid refrigerant may pass through the heat exchange pipe again through a return band 14 and be evaporated.

For example, the refrigerant flowed through the inflow hole a61 is evaporated while flowing through the heat exchange pipe located inside the outdoor heat exchanger 4, and a relatively large amount of liquid refrigerant is moved to the return band 14 to a second point b81 from a first point b61, but a relatively large amount of gaseous refrigerant may flow into the first header 11 through the bypass pipe 15.

Then, the refrigerant flows through the heat exchange pipe located inside the outdoor heat exchanger 4 from the second point b81 and is evaporated, and a relatively large amount of liquid refrigerant is moved from a third point a81 to a fourth point a83 through the return band 14, but a relatively large amount of gaseous refrigerant may flow into the second header 12 through the bypass pipe 15.

In addition, the refrigerant flows through the heat exchange pipe located inside the outdoor heat exchanger 4 from the forth point b83 and is evaporated, and a relatively large amount of liquid refrigerant is moved from a fourth point b83 to a sixth point b63 through the return band 14, but a relatively large amount of gaseous refrigerant may flow into the first header 11 through the bypass pipe 15.

Then, the refrigerant may flow through the heat exchange pipe located inside the outdoor heat exchanger 4 from the sixth point b63 and evaporate, and may flow into the above-described main header 42 through the discharge hole a63.

Accordingly, the gaseous refrigerant may be separated from the outdoor heat exchanger 4 at the middle stage of the outdoor heat exchanger 4 serving as an evaporator, so that the pressure loss of the refrigerant flowing through the outdoor heat exchanger 4 can be reduced. Consequently, heating performance of the air conditioner may be improved.

Figure 4:
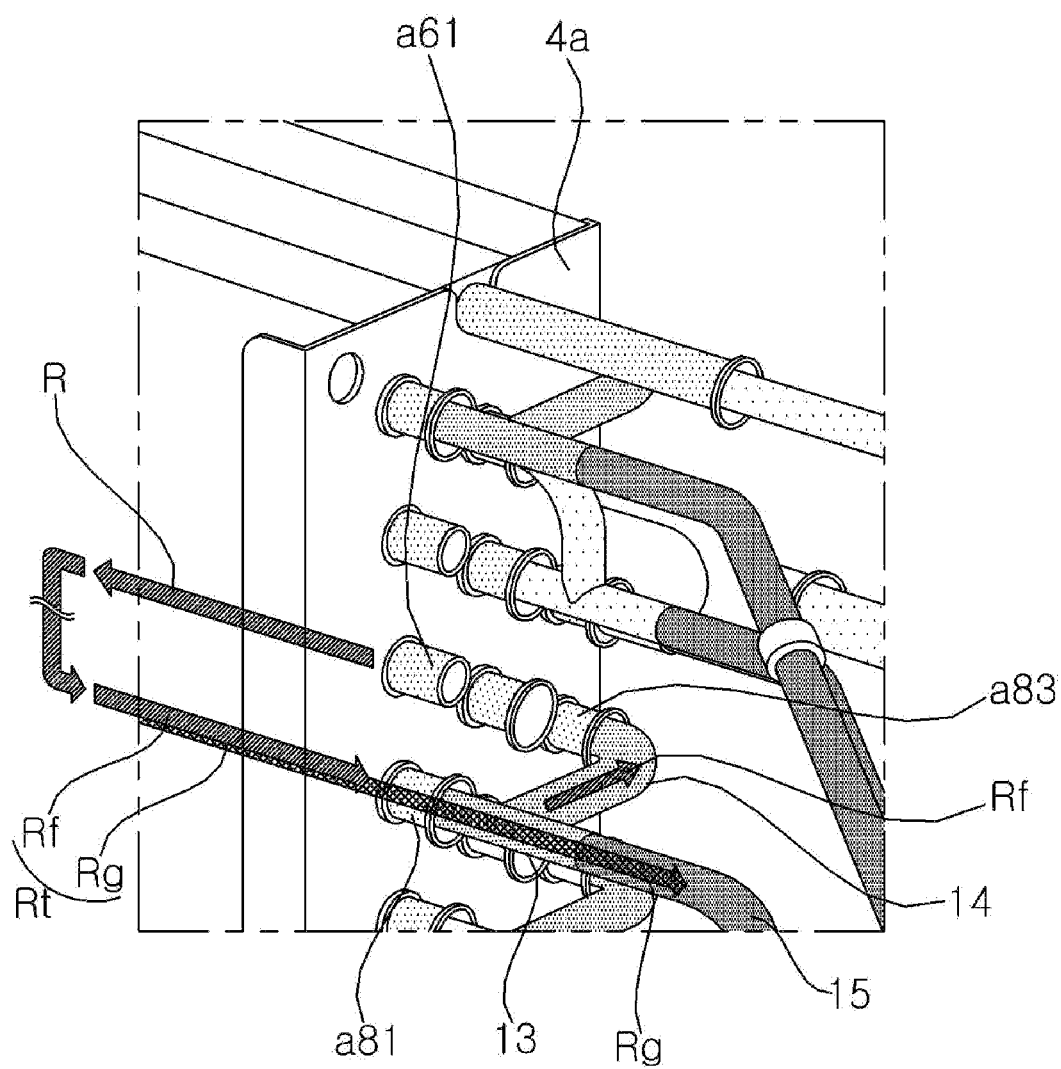
FIGS. 4 and 5 are diagrams for explaining a gas-liquid separation pipe and a bypass pipe coupled thereto according to an embodiment of the present disclosure.
Figure 5:
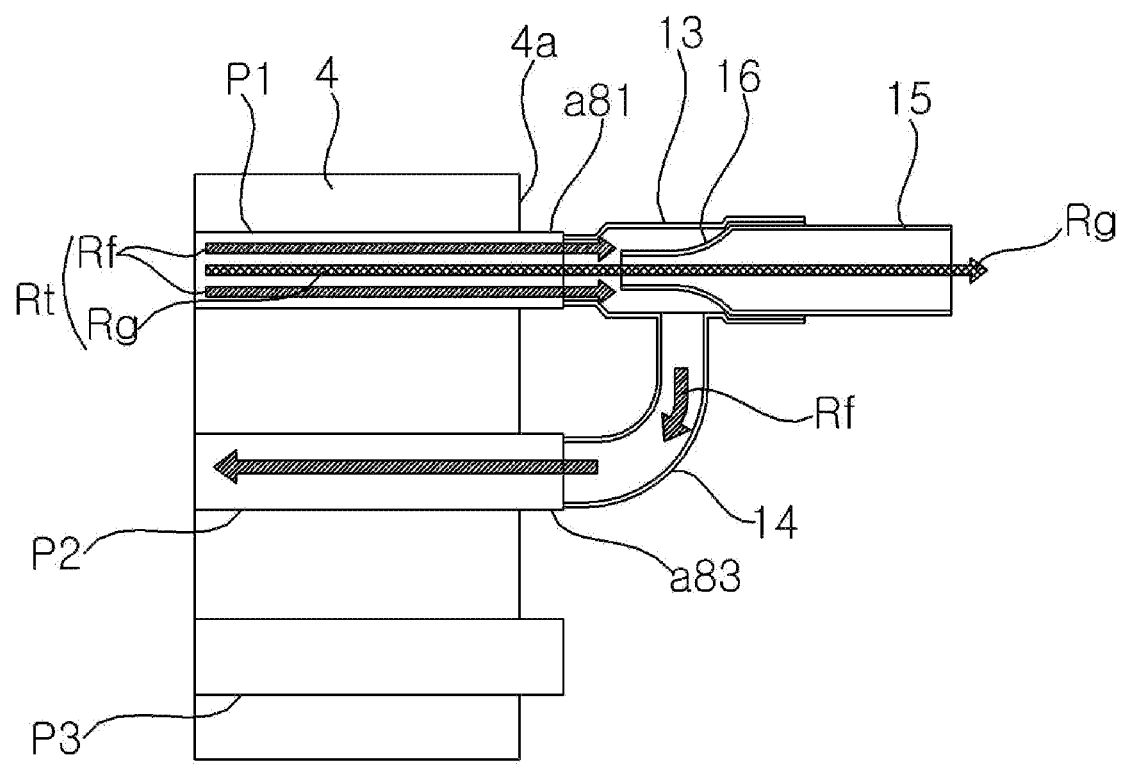

Referring to FIGS. 4 and 5, the refrigerant R flowed into the inflow hole a61 may be a two-phase refrigerant having a low dryness level or a liquid refrigerant. In addition, the refrigerant flowed into the inflow hole a61 passes through the heat exchange pipe and is partially evaporated by heat exchange with outdoor air, thereby increasing dryness. That is, the refrigerant that passed through the heat exchange pipe may pass through the third point a81 as a two-phase refrigerant Rt in which gaseous refrigerant Rg and liquid refrigerant Rf coexist.

Meanwhile, a gas-liquid separation pipe 13, 14 may be connected to the third point a81, the fourth point a83, and the bypass pipe 15. In other words, the gas-liquid separation pipe 13, 14 may be connected to the bypass pipe 15 while forming a part of the heat exchange pipe.

At this time, the gas-liquid separation pipe 13, 14 may include a first part 13 and a second part 14. One end of the first part 13 may be connected to the third point a81, and the other end of the first part 13 may be connected to the bypass pipe 15. In addition, the second part 14 may extend from the first part 13 at between one end and the other end of the first part 13 and be connected to the fourth point a84. For example, the second part 14 may extend in a direction intersecting the longitudinal direction of the first part 13. Meanwhile, the second part 14 may be referred to as a return band.

Meanwhile, the bypass pipe 15 may include a short tube 16 inserted into the first part 13. For example, the distal end of the short tube 16 may be adjacent to one end of the first part 13.

In addition, at least a part of the outer circumferential surface of the short tube 16 may be spaced apart from the inner surface of the first part 13. In other words, the outer diameter of the short tube 16 may be smaller than the inner diameter of the first part 13 in at least a part of section. For example, one end of the short tube 16 may have a first diameter while being adjacent to the third point a81, and the other end may have a second diameter larger than the first diameter. For example, the short tube 16 may be formed in a tapered shape whose diameter decreases toward the one end.

Meanwhile, the flow characteristics of the two-phase refrigerant in the pipe may vary depending on the flow rate or dryness of the refrigerant. When the two-phase refrigerant Rt passing through the heat exchange pipe has a flow rate and dryness within a certain range, the two-phase refrigerant Rt may exhibit an annular flow characteristic within the heat exchange pipe. Here, the annular flow means that the flow of the gaseous refrigerant Rg having a relatively fast flow rate is concentrated in the center of the pipe, whereas the flow of the liquid refrigerant Rf having a relatively slow flow rate and high viscosity is concentrated on the inner wall of the pipe. In addition, in order to increase the gas-liquid separation rate described later, it is preferable to design the outdoor heat exchanger 4 or the heat exchange pipe so that the two-phase refrigerant Rt passing through the heat exchange pipe exhibits the annular flow characteristic, or to adjust the operation frequency or the like of the compressor 1.

In this case, among the two-phase refrigerant Rt flowing into the first part 13 through the third point a81, a relatively large amount of gaseous refrigerant Rg concentrated in the center of the refrigerant flow may easily flow into the short tube 16, and a relatively large amount of liquid refrigerant Rf concentrated around the refrigerant flow may easily flow into the second part 14.

Accordingly, gaseous refrigerant and liquid refrigerant may be separated at a high ratio in the middle stage of the outdoor heat exchanger 4 serving as an evaporator, so that the pressure loss of the refrigerant flowing through the outdoor heat exchanger 4 can be significantly reduced. Consequently, the heating performance of the air conditioner can be significantly improved.

Figure 6:
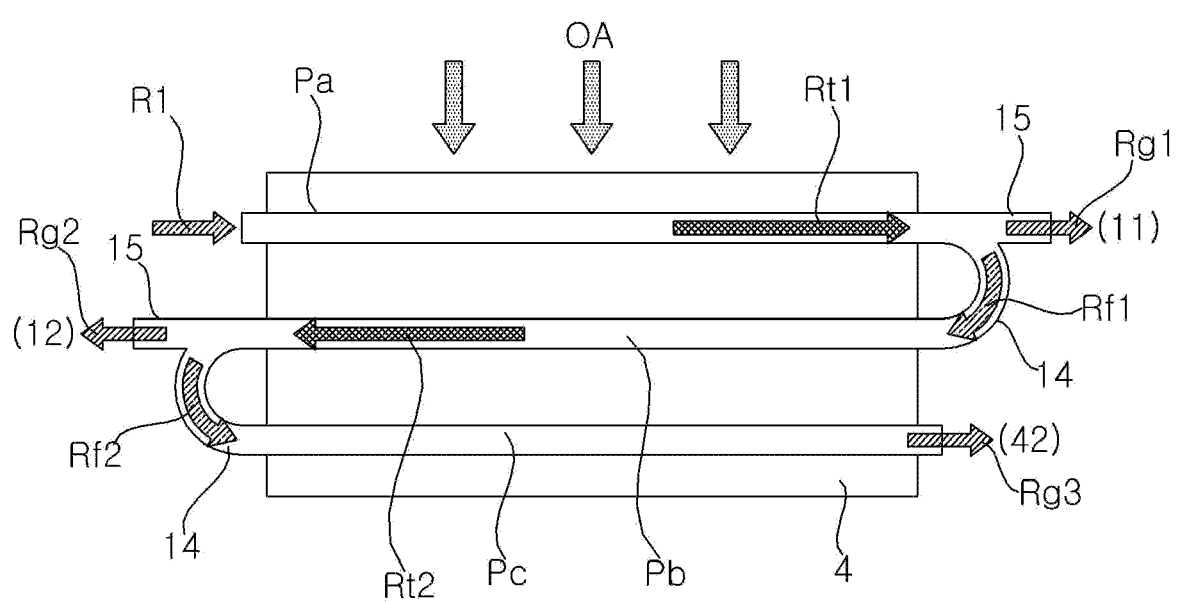
FIG. 6 is a diagram illustrating a flow of refrigerant that flows into the outdoor heat exchanger and passes through the outdoor heat exchanger according to an embodiment of the present disclosure.

Referring to FIGS. 2 and 6, the heat exchange pipe may include a first section Pa, a second section Pb, and a third section Pc spaced apart from each other inside the outdoor heat exchanger 4. In addition, the first section Pa may be connected to the second section Pb through the second part 14, and the second section Pb may be connected to the third section Pc through the second part 14. In addition, the refrigerant R1 flowing into the first section Pa may flow through the first section Pa, the second section Pb, and the third section Pc sequentially, and receive heat energy from the outdoor air OA and be evaporated.

For example, the controller C may open both the first valve V1 and the second valve V2 in the heating operation mode of the air conditioner. In this case, the refrigerant may flow into the accumulator 6 from the middle stage of the outdoor heat exchanger 4 via the first header 11 and the second header 12.

For another example, the controller C may control the opening and closing of the first valve V1 and the second valve V2, in response to the flow rate or flow velocity of the refrigerant circulating through the refrigerant pipe in the heating operation mode of the air conditioner. In this case, the refrigerant may flow into the accumulator 6 from the middle stage of the outdoor heat exchanger 4 via the first header 11 and/or the second header 12.

Specifically, when the flow rate of the refrigerant circulating through the refrigerant pipe in the heating operation mode of the air conditioner is less than a reference flow rate, the controller C may open the first valve V1 while closing the second valve V2, or may open both the first valve V1 and the second valve V2. For example, the reference flow rate may be 100 Hz when the maximum operating frequency of the compressor 1 is 165 Hz. In this case, the refrigerant flowed into the first section Pa has a relatively small flow rate, and has a dryness that easily increases to 0.5 to 0.6 while passing through the first section Pa, thereby exhibiting the above-described annular flow characteristics.

Accordingly, since the refrigerant Rt1 passing through the first section Pa may be easily separated into the gaseous refrigerant Rg1 and the liquid refrigerant Rf1 through the above-described gas-liquid separation pipe 13, 14, the separated gaseous refrigerant Rg1 may be bypassed to the accumulator 6 via the bypass pipe 15, the first header 11, and the first valve V1. In addition, the separated liquid refrigerant Rf1 may flow into the second section Pb through the second part 14 and be evaporated. At this time, it is also possible that the refrigerant Rt2 passing through the second section Pb is separated into the gaseous refrigerant Rg2 and the liquid refrigerant Rf2 through the gas-liquid separation pipe 13, 14, and the separated gaseous refrigerant Rg2 is bypassed to the accumulator 6 via the bypass pipe 15, the second header 12, and the second valve V2. Meanwhile, the separated liquid refrigerant Rf2 may flow into the third section Pc through the second part 14 and be evaporated, and flow into the accumulator 6 via the main header 42 as a gaseous refrigerant Rg3.

At this time, the gas-liquid separation pipe 13, 14 separating the gaseous refrigerant Rg1 and the liquid refrigerant Rf1 may be spaced apart from the gas-liquid separation pipe 13, 14 separating the gas-phase refrigerant Rg2 and the liquid-phase refrigerant Rf2 with the second section Pb interposed therebetween. In addition, the gas-liquid separation pipe 13, 14 separating the gaseous refrigerant Rg1 and the liquid refrigerant Rf1 may be located upstream of the heat exchange pipe than the gas-liquid separation pipe 13, 14 separating the gas-phase refrigerant Rg2 and the liquid-phase refrigerant Rf2.

Meanwhile, the controller C may close the first valve V1 while opening the second valve V2, when the flow rate of the refrigerant circulating through the refrigerant pipe is greater than the reference flow rate in the heating operation mode of the air conditioner. For example, the reference flow rate may be 100 Hz when the maximum operating frequency of the compressor 1 is 165 Hz. In this case, since the refrigerant flowed into the first section Pa has a relatively high flow rate, the dryness may not sufficiently increase while passing through the first section Pa, so that the above-described annular flow characteristics may not be exhibited. Thus, the refrigerant Rt1 passing through the first section Pa may be guided to the second section Pb through the second part 14, and the dryness of the refrigerant flowed into the second section Pb may easily increase to 0.5 to 0.6 while passing through the second section Pb, thereby exhibiting the above-mentioned annular flow characteristics.

Accordingly, since the refrigerant passing through the second section Pb may be easily separated into gaseous refrigerant and liquid refrigerant through the above-described gas-liquid separation pipe 13, 14, the separated gaseous refrigerant may be bypassed to the accumulator 6 via the bypass pipe 15, the second header 12, and the second valve V2. Then, the separated liquid refrigerant may be flowed into the third section Pc through the second part 14, evaporated, and flowed into the accumulator 6 via the main header 42 as a gaseous refrigerant.

That is, in preparation for the change in the dryness distribution of the refrigerant in the passage of the heat exchange pipe according to the change in the required load of the air conditioner or the flow rate of the refrigerant circulating through the refrigerant pipe, it is possible that a point where gaseous refrigerant and liquid refrigerant can be efficiently separated is set variably. Accordingly, it is possible to minimize an inflow of liquid refrigerant into the accumulator 6 through the first header 11 or the second header 12.

According to an aspect of the present disclosure, there is provided an air conditioner including: a compressor which compresses refrigerant; an accumulator which supplies refrigerant to the compressor; a condenser which condenses refrigerant discharged from the compressor; an expansion valve which expands refrigerant passing through the condenser; an evaporator which has a heat exchange pipe through which refrigerant passing through the expansion valve flows, and evaporates refrigerant flowing through the heat exchange pipe; a gas-liquid separation pipe which connects a first point and a second point located between one end and the other end of the heat exchange pipe; and a bypass pipe which has one end connected to the gas-liquid separation pipe and the other end connected to the accumulator, wherein the gas-liquid separation pipe comprises: a first part which has one end connected to the first point and the other end connected to one end of the bypass pipe; and a second part which extends from the first part at between one end and the other end of the first part, and is connected to the second point.

In addition, according to another aspect of the present disclosure, the bypass pipe further includes a short tube which is inserted to the inside of the first part, and at least a part of which is spaced apart from an inner surface of the first part.

In addition, according to another aspect of the present disclosure, one end of the short tube is adjacent to the first point and has a first diameter, and the other end of the short tube has a second diameter greater than the first diameter.

In addition, according to another aspect of the present disclosure, the first part is elongated, and the second part is extended in a direction intersecting a longitudinal direction of the first part.

In addition, according to another aspect of the present disclosure, the air conditioner further includes: a header into which refrigerant passing through the bypass pipe flows; a pipe which is installed between the header and the accumulator, and provides a passage of refrigerant connecting the header and the accumulator; and a valve which is installed in the pipe, and opens and closes the passage of the pipe.

In addition, according to another aspect of the present disclosure, the gas-liquid separation pipe further includes: a first gas-liquid separation pipe; and a second gas-liquid separation pipe which is spaced apart from the first gas-liquid separation pipe with a part of the heat exchange pipe interposed therebetween, wherein the bypass pipe further includes: a first bypass pipe connected to the first gas-liquid separation pipe; and a second bypass pipe connected to the second gas-liquid separation pipe, wherein the header further includes: a first header into which refrigerant passing through the first bypass pipe flows; and a second header into which refrigerant passing through the second bypass pipe flows.

In addition, according to another aspect of the present disclosure, the second gas-liquid separation pipe connects a third point and a fourth point located between one end and the other end of the heat exchange pipe, wherein the third point and the fourth point are located downstream of the heat exchange pipe than the first point and the second point.

In addition, according to another aspect of the present disclosure, the pipe further includes: a first pipe which is installed between the first header and the accumulator, and provides a passage of refrigerant connecting the first header and the accumulator; and a second pipe which is installed between the second header and the accumulator, and provides a passage of refrigerant connecting the second header and the accumulator, wherein the valve further includes: a first valve which is installed in the first pipe, and opens and closes the passage of the first pipe; and a second valve which is installed in the second pipe, and opens and closes the passage of the second pipe.

In addition, according to another aspect of the present disclosure, the air conditioner further includes a controller for controlling the opening and closing of the first valve and the second valve, wherein when a flow rate of refrigerant flowing into the heat exchange pipe is less than a reference flow rate, the controller opens the first valve, and opens or closes the second valve.

In addition, according to another aspect of the present disclosure, when the flow rate of refrigerant flowing into the heat exchange pipe is greater than the reference flow rate, the controller closes the first valve, and opens the second valve.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An air conditioner, comprising:
 a compressor that compresses a refrigerant;
 an accumulator that supplies the refrigerant to the compressor;
 a condenser that condenses the refrigerant discharged from the compressor;
 an expansion valve that expands the refrigerant-passing having passed through the condenser;

an evaporator has that includes a heat exchange pipe through which the refrigerant having passed through the expansion valve flows, and evaporates refrigerant flowing through the heat exchange pipe;

a gas-liquid separation pipe that connects a first point and a second point located between a first end and the other a second end of the heat exchange pipe; and a bypass pipe a first end of which is connected to the gas-liquid separation pipe and a second end of which is connected to the accumulator, wherein the gas-liquid separation pipe comprises:
 a first portion a first end of which is connected to the first point and a second end of which is connected to the first end of the bypass pipe; and
 a second portion that extends from the first portion between the first end and the second end of the first portion, and is connected to the second point;

a header into which the refrigerant having passed through the bypass pipe flows;

a pipe that is installed between the header and the accumulator, and provides a passage for the refrigerant between the header and the accumulator; and a valve that is installed in the pipe, and opens and closes the passage of the pipe, and wherein the gas-liquid separation pipe comprises:
 a first gas-liquid separation pipe; and
 a second gas-liquid separation pipe which is spaced apart from the first gas-liquid separation pipe with a portion of the heat exchange pipe interposed therebetween, wherein the bypass pipe comprises:
  a first bypass pipe connected to the first gas-liquid separation pipe; and
  a second bypass pipe connected to the second gas-liquid separation pipe, and wherein the header comprises:
   a first header into which the refrigerant having passed through the first bypass pipe flows; and
   a second header into which the refrigerant having passed through the second bypass pipe flows.

2. The air conditioner of claim 1, wherein the bypass pipe further comprises a short tube which is inserted into an inside of the part portion, and at least a portion of which is spaced apart from an inner surface of the first portion.

3. The air conditioner of claim 2, wherein a first end of the short tube is disposed adjacent to the first point and has a first diameter, and wherein a second end of the short tube has a second diameter which is greater than the first diameter.

4. The air conditioner of claim 1, wherein the first portion is elongated, and wherein the second portion extends in a direction intersecting a longitudinal direction of the first portion.

5. The air conditioner of claim 1, wherein the second gas-liquid separation pipe connects a third point and a fourth point located between the first end and the second end of the heat exchange pipe, and wherein the third point and the fourth point are located further downstream of the heat exchange pipe than the first point and the second point.

6. The air conditioner of claim 5, wherein the pipe further comprises:
 a first pipe that is installed between the first header and the accumulator, and provides a passage for refrigerant between the first header and the accumulator; and
 a second pipe that is installed between the second header and the accumulator, and provides a passage of for refrigerant between the second header and the accumulator, and wherein the valve further comprises:
  a first valve that is installed in the first pipe, and opens and closes the passage of the first pipe; and
  a second valve that is installed in the second pipe, and opens and closes the passage of the second pipe.

7. The air conditioner of claim 6, further comprising a controller that controls an opening and closing of the first valve and the second valve, wherein when a flow rate of the refrigerant flowing into the heat exchange pipe is less than a reference flow rate, the controller opens the first valve, and opens or closes the second valve.

8. The air conditioner of claim 5, wherein when the flow rate of refrigerant flowing into the heat exchange pipe is greater than the reference flow rate, the controller closes the first valve, and opens the second valve.

* * * * *